Nov. 15, 1927.

L. H. PETER 1,649,543

ELECTRICAL OPERATION OF RAILWAY POINTS AND SIGNALS

Filed July 13, 1925     2 Sheets-Sheet 1

INVENTOR:
L. H. Peter,
BY A. L. Vincill
His ATTORNEY

Nov. 15, 1927.

L. H. PETER 1,649,543

ELECTRICAL OPERATION OF RAILWAY POINTS AND SIGNALS

Filed July 13, 1925

2 Sheets-Sheet 2

INVENTOR:
L. H. Peter,
BY A. L. Vencill
ATTORNEY

Patented Nov. 15, 1927.

1,649,543

UNITED STATES PATENT OFFICE.

LESLIE HURST PETER, OF LONDON, ENGLAND, ASSIGNOR, BY MESNE ASSIGNMENTS, TO THE UNION SWITCH & SIGNAL COMPANY, OF SWISSVALE, PENNSYLVANIA, A CORPORATION OF PENNSYLVANIA.

ELECTRICAL OPERATION OF RAILWAY POINTS AND SIGNALS.

Application filed July 13, 1925, Serial No. 43,151, and in Great Britain October 27, 1924.

My invention relates to the electrical operation of railway points or switches and signals or other traffic governing devices in cases in which a supply of electrical energy at a suitable voltage for this purpose from transmission conductors is not available or desirable.

In order to secure economy in the transmission of the necessary electrical energy from the signal cabin or other point of supply or control to the motor mechanism for operating the switches or signals, which may be at some distance away, it is evidently desirable that the voltage of supply should be relatively high of the order, for instance, of 100 volts, but the capital cost and the cost of maintenance of a battery having a requisite number of cells for this voltage is comparatively great and the object of my invention is to provide improved arrangements whereby a supply of electrical energy at the required relatively high voltage may be readily and economically obtained from the relatively low voltage battery usually provided at the signal cabin for other purposes, or from any other available source of supply, the voltage of which is unsuitable for direct utilization.

According to my present invention, a motor generator is provided preferably arranged adjacent to the source of supply available, the motor element of this apparatus being arranged to be automatically connected to the source of supply only when operating current for the switches or signals is actually required, the motor mechanism for operating the switches or signals being connected to the generator element of the motor generator. As the actual amount of electrical energy for operating a switch or a signal is comparatively small owing to the short period of time during which operating current is required, the arrangement above specified enables economical electric operation of the switches or signals to be obtained without imposing a heavy continuous load on the low voltage battery, the capacity of which need not therefore necessarily be increased, while the capital cost and cost of maintenance of the motor generator is considerably less than would be incurred by the provision of a relatively high voltage battery which would also occupy a considerable amount of space.

Figure 1:
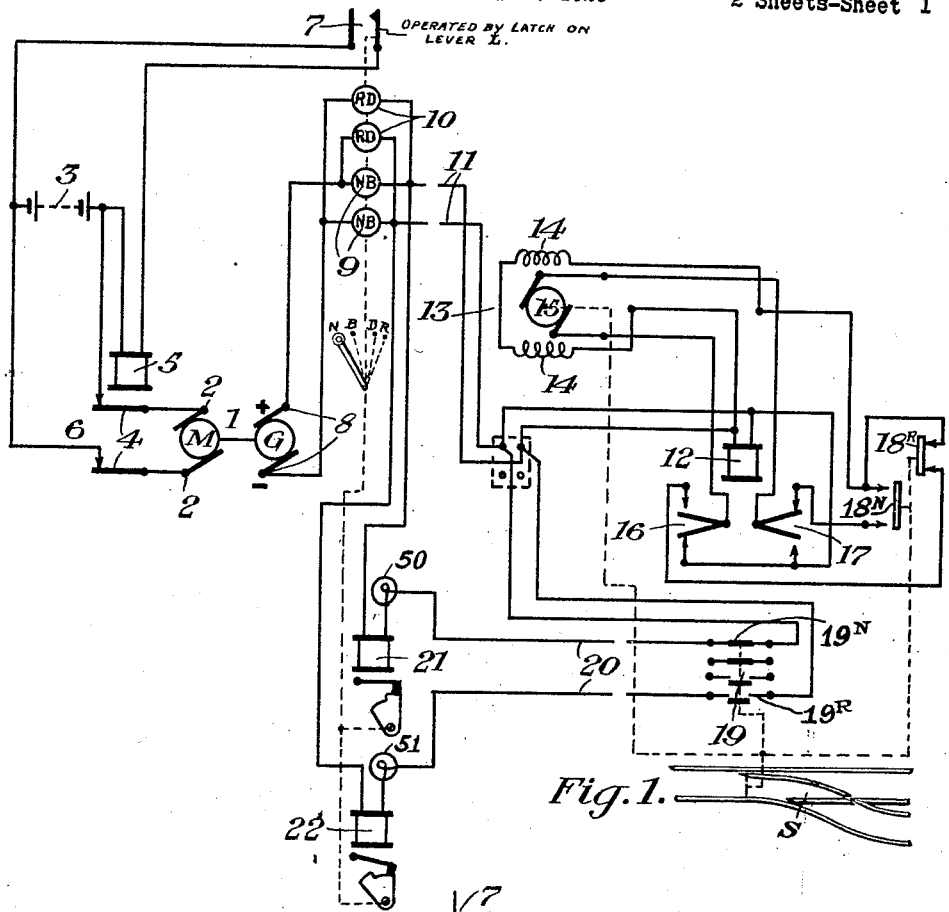
Figure 2:
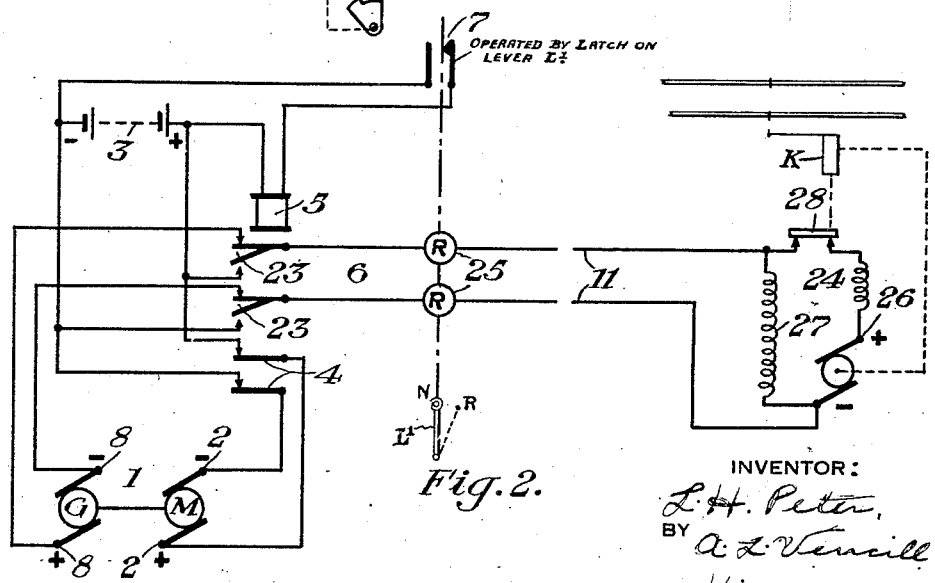
Figure 3:
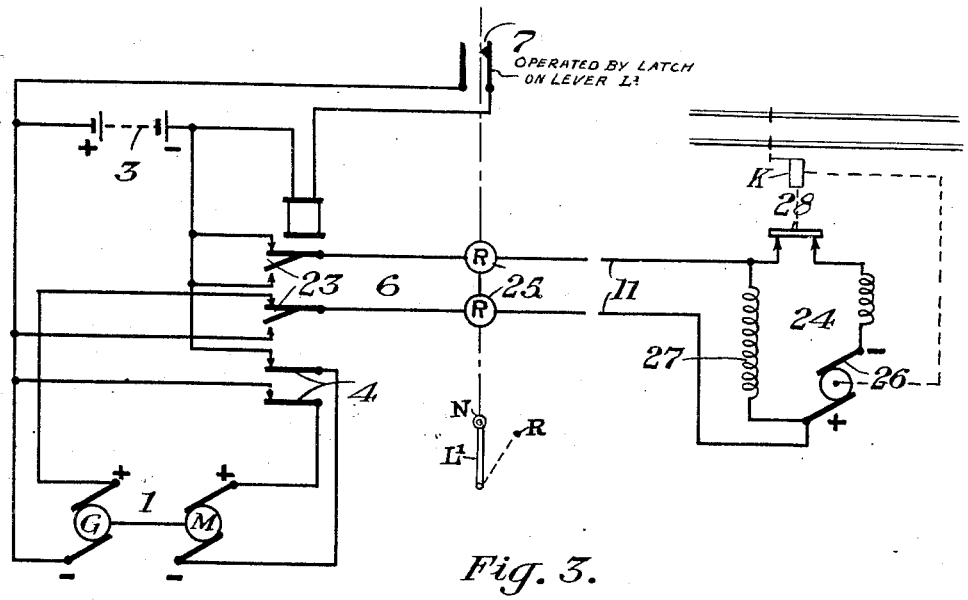
Figure 4:
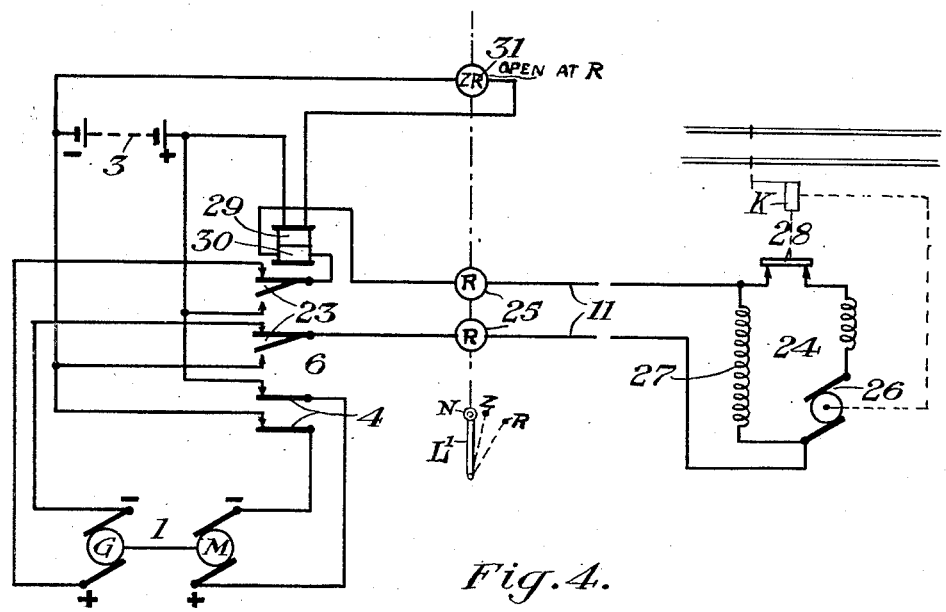

My invention is illustrated by way of example in the accompanying drawings, of which Fig. 1 is a diagram of connections for switch operating apparatus embodying one form of my invention;

Fig. 2 being a similar diagram of connections for signal operating apparatus;

Figs. 3 and 4 are diagrams illustrating modifications of the arrangement shown in Fig. 2.

Referring now first to the arrangement shown in Fig. 1, it will be seen that the apparatus at the signal cabin comprises a motor generator set 1, the motor terminals 2 of which are arranged to be connected to the terminals of the usual low voltage battery 3 provided for other purposes at the signal cabin through a pair of contacts 4 which are normally open and are arranged to be closed by the energization of a winding 5 of a relay 6. The winding 5 is connected across the terminals of the battery 3, through a contact 7 adapted to be closed when the latch of the switch lever L is operated preparatory to movement of the lever. The motor element M of the motor generator set 1 is suitably designed for the voltage of the low voltage battery 3 the generator element G being designed for a suitably high voltage to enable current to be economically transmitted and applied at the switch operating mechanism.

The lever L, in accordance with the usual practice, is arranged to occupy a normal position N, a normal indicating position B, a reverse indicating position D, or a reverse position R. Contacts 10 of the lever are closed when the lever is at R, D, or any position between these two positions, and contacts 9 are closed when the lever is at N, B, or any position intermediate N and B.

The generator terminals 8 of the set 1 are connected through the contacts 9, 10 operated by the switch control lever to a pair of transmission conductors 11, these contacts being so arranged that when the lever is moved from its normal to its reverse position, the connections of the generator terminals 8 to the transmission conductors 11 are reversed so as to reverse the polarity of the voltage impressed upon the transmission conductors. The latter are connected at the points to a polarized relay 12 adapted, when energized, by current of one or the other polarity, to close a circuit from the transmission conductors 11 to the windings of the switch operating motor 13 so as to cause the operation of this motor in one direction or the other to move the switch S to one or other of its operative positions.

As shown in the figure, the switch operating motor 13 comprises a field winding 14 and an armature 15, the relay 12 being provided with armatures 16, 17 carrying contacts adapted to reverse the connection of the armature 15 when the direction of the flow of current through the relay 12 is reversed. The motor circuit also includes the usual cut-out switches $18^R$ and $18^N$ arranged to open only when the switch is in the extreme reverse or extreme normal position respectively, and thereby adapted to open the motor circuit as soon as the switch is fully set into either of its extreme positions.

The switch operating mechanism is also provided with the usual point detector 19 comprising two contacts $19^N$ and $19^R$ which are only closed when the switch is fully set in the normal or the reverse position respectively, thereby completing a circuit through indication conductors 20 leading to the signal cabin and connected through locking magnets 21, 22 controlling the operation of the switch lever L in the usual manner. The usual indication lamps 50 and 51 are connected in series with magnets 21 and 22, respectively, to inform the operator when the associated locking magnets are energized.

In operation, it will be understood that when it is desired to set the switch the latch of the switch lever is first actuated to close the contact 7 so as to energize the circuit of the relay 6 controlling the contacts 4 through which the low voltage battery 3 is connected to the motor terminals 2 of the motor generator set 1. The latter is thereby started into operation, and as soon as the switch lever is operated current is supplied from the generator terminals 8 of the motor generator set 1, through the contacts 9 or 10 closed in the new position of the point lever to the point operating motor 13, which is thereby actuated to set the switch.

As soon as the switch is fully set, the circuit for motor 13 is broken at contact $18^N$ or $18^R$, and the corresponding contacts of the point detector 19 are closed, and the corresponding lock magnet 21 or 22 at the signal cabin is energized, thereby permitting the point lever to complete its movement. Until this movement is completed the latch cannot be released so that the generator circuit of the motor generator 1 is maintained until the lever has completed its full movement, whereupon the latch being released, the energizing circuit of the relay 6 is interrupted and the motor terminals 2 of the motor generator are disconnected at the contacts 4 of the relay 6 from the low voltage battery 3.

In the arrangements for operating a signal shown in Fig. 2, the relay 6 is adapted to be energized by the actuation of the latch contact 7, of the signal lever $L^1$ as in the system of Fig. 1, the energization of the relay 6 effecting the connection of the low voltage battery 3 to the terminals 2 of the motor element M of the motor generator set 1 through the contacts 4.

The relay 6 is also arranged to operate two bridging contacts 23, which, when the winding 5 of the relay 6 is thus energized, serve to connect the transmission conductors 11 leading to the actuating mechanism 24 of the signal K to the generator terminals 8 of the motor generator set 1, the bridging contacts 23 when the relay 6 is de-energized connecting the transmission conductors 11 to the terminals of the low voltage battery 3.

Signal lever $L^1$ can occupy either a normal position N or a reverse position R, and comprises two contacts 25 arranged to be closed only when the lever is in the R position. The circuit of the transmission conductors 11 is controlled by the contacts 25 operated by the signal lever and the signal actuating mechanism comprises, as shown, the usual motor 26 for setting the signal, and clutch coils 27 for holding the signal in position when set, in addition to the usual cut-out switch 28 for opening the motor circuit when the signal is fully set.

When it is required to set the signal, the latch of the signal lever $L^1$ is actuated thereby closing the contact 7 and causing the relay 6 to be energized and effect the connection of the low voltage battery 3 to the motor terminals 2 of the motor generator set 1. The signal lever is then operated and completes a circuit through the contacts 25 from the generator terminals 8 of the motor generator set to the transmission conductors 11 through which electrical energy is supplied to the signal actuating mechanism 24 to set the signal, the circuit of this mechanism being automatically interrupted at the cut-out switch 28 in the usual manner as soon as the signal is fully set. The latch of the signal lever is then released and the bridging contacts 23 of the relay 6 operate to disconnect the transmission conductors 11 from the generator G and to connect these conductors to the low voltage battery 3, so as to maintain current through the clutch coils 27 of the signal operating mechanism 24. When the signal lever is returned to its original position the circuit through the transmission conductors 11 is interrupted at the contacts 25 of the lever and the circuit of the clutch coils 27 is thus interrupted, permitting the signal to return to its normal position.

It will be understood that the usual or any suitable arrangements may be provided for indicating to the operator that the signal has been fully set, so as to notify the operator that the catch handle may be released or alternatively, an indication lock arranged to be released only when the signal setting has been completed and controlling the release of the catch handle may be provided, thus effecting a positive check on the operation in a similar manner to that above described with reference to switch operation.

Referring now to the modified arrangement shown in Fig. 3, the voltage impressed upon the transmission conductors for effecting the supply of electrical energy to the signal operating mechanism is arranged to be that of the low voltage battery 3 and the generator element G of the motor generator set 1 in series with one another, the generator G serving in this case as a booster. The bridging contacts 23 of the relay 6 in this arrangement serve to connect the transmission conductors 11 to the low voltage battery 3 when the relay 6 is de-energized, whereas when the relay is energized by the actuation of the latch contact 7 of the signal lever, the low voltage battery 3 and the generator element G of the motor generator set 1 are connected in series with one another to the transmission conductors 11 through the contacts 25 on the signal lever which are arranged to be closed when the lever is in a position to set the signal. As in the arrangement of Fig. 2, the release of the latch after the signal lever has been operated is arranged to cause the de-energization of the relay 6 whereupon the bridging contacts 23 connect the low voltage battery 3 only to the transmission conductors 11, current being thus supplied from this battery to the clutch coils 27 of the signal operating mechanism 24.

Referring now to the still further modification shown in Fig. 4, this is intended to prevent the possibility of the signalman operating the signal lever too quickly and releasing the catch handle so as to open the contacts 7 and de-energize the relay 6 before the signal is fully set, as under these conditions the motor generator set 1 would cease to operate upon the completion of the movement of the signal lever and the signal not having been fully set would return to its normal position.

In the arrangement shown in Fig. 4, the relay 6 is provided with a pick-up winding 29 and a hold-up winding 30. The connection of the winding 29 to the low voltage battery 23 is controlled by a contact 31 on the signal lever, this contact being closed as soon as the lever reaches a position Z slightly away from the normal position, and remaining closed until the lever is moved to its extreme R position. The energization of the winding 29 causes the contacts 4 to connect the low voltage battery 3 to the motor element M of the motor generator set 1, and the bridging contacts 23 to connect the generator element G to the transmission conductors 11 through the contacts 25 on the signal lever, this circuit including the hold-up winding 30 of the relay 6. The winding 30 is consequently energized as soon as the generator element G of the motor generator set 1 commences to generate current and the winding 30 serves to retain the relay contacts 4 and 23 closed after contact 31 is opened until the circuit of the signal operating mechanism 24 is interrupted when the signal is fully set at the cut-out switch 28. It will be understood that with this arrangement the contacts 25 and 31 operated by the signal lever overlap to some extent so as to ensure that the contacts 31 will not be opened until after the contacts 25 have been closed.

The same result may obviously be obtained in other ways as, for instance, by providing in the arrangements shown in Figs. 2, 3 or 4, a relay 6 having slow releasing characteristics.

It will be understood that the power for operating the motor generator 1 above referred to may be obtained from any available source other than the low voltage battery 3 at the signal cabin, as, for instance, from the transmission mains for supplying propulsion current in the case of an electric railway.

Furthermore, if desired, the generator G of the motor generator set 1 may be an alternating current generator excited from the low voltage battery 3 or other suitable source of direct current.

In these and other respects my invention can evidently be carried into practice in a variety of different ways, without exceeding the scope thereof.

Having now particularly described and ascertained the nature of my said invention, and in what manner the same is to be performed, I declare that what I claim is:

1. In combination, a traffic governing device, a source of energy, a motor generator, means for at times connecting the generator element of the motor generator with the device to operate the device, and means for automatically connecting the motor element of the motor generator with the source only when current is actually required to operate the device.

2. In combination, a traffic governing device, a source of energy, a motor generator, a lever for at times connecting the generator element of the motor generator with the device, a latch on the lever, and means controlled by the latch for connecting the motor element of the motor generator with the source.

3. In combination, a traffic governing device, a source of energy, a motor generator, and a lever for at times connecting the source with the motor element and the device with the generator element of the motor generator.

4. In combination, a traffic governing device, a low voltage battery located at a point remote from the device, a motor generator adjacent the source, a lever for connecting the generator element of the motor generator with the device, and a relay controlled by the lever for connecting the motor element of the motor generator with the source.

5. In combination, a traffic governing device, a source of energy, a motor generator having a motor element at times receiving energy from the source, means for at times connecting the generator element of the motor generator with the device, and means for automatically disconnecting the motor element from the source when the operation of the device is completed.

6. In combination, a railway signal comprising an operating motor and a clutch winding, a motor generator, a source of energy, means for connecting the source with the motor element and the signal operating motor with the generator element of the motor generator to operate the signal, and means effective after the signal has been operated to connect the clutch winding with the source.

7. In combination, a railway signal, a motor generator, a source of energy, a lever arranged when operated to connect the generator element of the motor generator with the operating mechanism of the signal, a relay provided with a pick-up winding adapted to be energized by the preliminary movement of the lever, and a holdup winding energized by the current supplied by the generator element of the motor generator, and means controlled by the relay for connecting the motor element of the motor generator with the source.

In testimony whereof I affix my signature.

LESLIE HURST PETER.